(12) United States Patent
Zaleski

(10) Patent No.: US 7,747,595 B2
(45) Date of Patent: Jun. 29, 2010

(54) METHODS AND SYSTEMS FOR ELECTRONIC PUBLISHING CONTENT MANAGEMENT

(76) Inventor: Brian Zaleski, 25 Little Creek La., Novato, CA (US) 94945

( * ) Notice: Subject to any disclaimer, the term of this patent is extended or adjusted under 35 U.S.C. 154(b) by 185 days.

(21) Appl. No.: 10/912,429

(22) Filed: Aug. 4, 2004

(65) Prior Publication Data

US 2006/0031254 A1    Feb. 9, 2006

(51) Int. Cl.
*G06F 17/30* (2006.01)

(52) U.S. Cl. .................. 707/705; 707/736; 707/737; 707/706; 707/707; 707/708

(58) Field of Classification Search ................. 709/201; 273/292; 434/118; 707/104.1, 3, 9
See application file for complete search history.

(56) References Cited

U.S. PATENT DOCUMENTS

| | | | |
|---|---|---|---|
| 5,597,312 A * | 1/1997 | Bloom et al. | 434/362 |
| 6,318,265 B1 * | 11/2001 | Sobel et al. | 101/483 |
| 2002/0152257 A1 * | 10/2002 | Frolik et al. | 709/201 |
| 2002/0190471 A1 * | 12/2002 | Vancura et al. | 273/292 |
| 2003/0040899 A1 * | 2/2003 | Ogilvie | 704/2 |
| 2003/0167197 A1 * | 9/2003 | Shoemaker et al. | 705/10 |
| 2004/0068481 A1 * | 4/2004 | Seshadri et al. | 707/1 |
| 2004/0169685 A1 * | 9/2004 | Kubala | 345/809 |
| 2005/0055299 A1 * | 3/2005 | Chambers et al. | 705/36 |
| 2005/0069849 A1 * | 3/2005 | McKinney et al. | 434/178 |
| 2005/0196730 A1 * | 9/2005 | Kellman | 434/118 |

OTHER PUBLICATIONS

Goh et al., "Patron-augmented digital libraries", Proceedings of the fifth ACM conference on Digital libraries, 2000, p. 153-163. Retrieved from the Internet:<URL: http://portal.acm.org/ft_gateway.cfm?id=336656&type=pdf&coll=ACM&dl=ACM&CFID=75907046&CFTOKEN=15135651>.*

Henke et al., "The global impact of eBooks on ePublishing", Proceedings of the 19th annual international conference on Computer documentation, Oct. 21, 2001, p. 172-180. Retrieved from the Internet:<URL: http://portal.acm.org/ft_gateway.cfm?id=501551&type=pdf&coll=ACM&dl=ACM&CFID=75907046&CFTOKEN=15135651>.*

* cited by examiner

*Primary Examiner*—Jean M Corrielus
*Assistant Examiner*—Dennis Myint

(57) ABSTRACT

The experience of an end user of a work is enhanced by incrementally distributing the work and supplementing the work by adding an additional interactive component. Installments of works are delivered to the end user on a scheduled basis (and may optionally be delivered upon demand by the end user), or as a benefit delivered in exchange for end user interaction fulfilling certain criteria. The end user is requested or required to perform a task associated with the installment before a subsequent installment is delivered. The user's response (or lack thereof) to the task is recorded, and the user is optionally enabled to later review his or her responses. Each task may have correct or incorrect answers, or the task may require an ad hoc response(s). Optionally, an administrator may review the responses of the tasks of various users assigned to a particular administrator.

29 Claims, 9 Drawing Sheets

(Flow to the User)

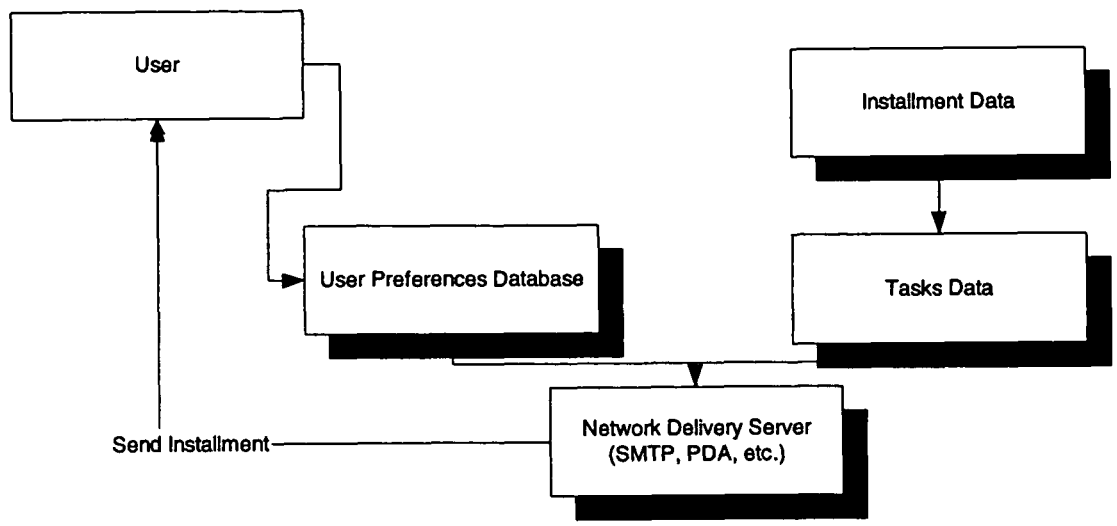
FIG. 1 (Flow to the User)
An example of this might be a portion of a work delivered to an end User via email:
FIG. 2 (Example of Installment in email format)

Example of a link and Task as part of an Installment email:
```
Today's action item:
Why did LAERTES return?
Follow this link:
http://www.mybookz.com/index.cfm?action=task&tid=2340&iid=26
```
FIG. 3 (Example of Task link in email format)
A) Login screen:
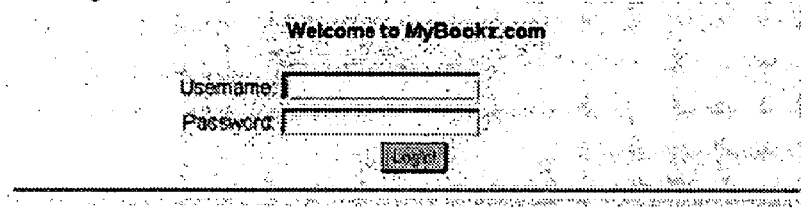
FIG. 4 (Example of web-based login screen for User)
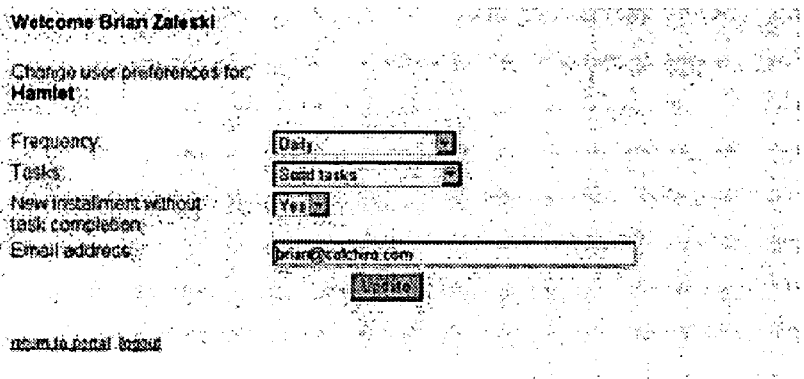
FIG. 5 (Example of web-based User preferences screen)

Figures 6, 7, 8:
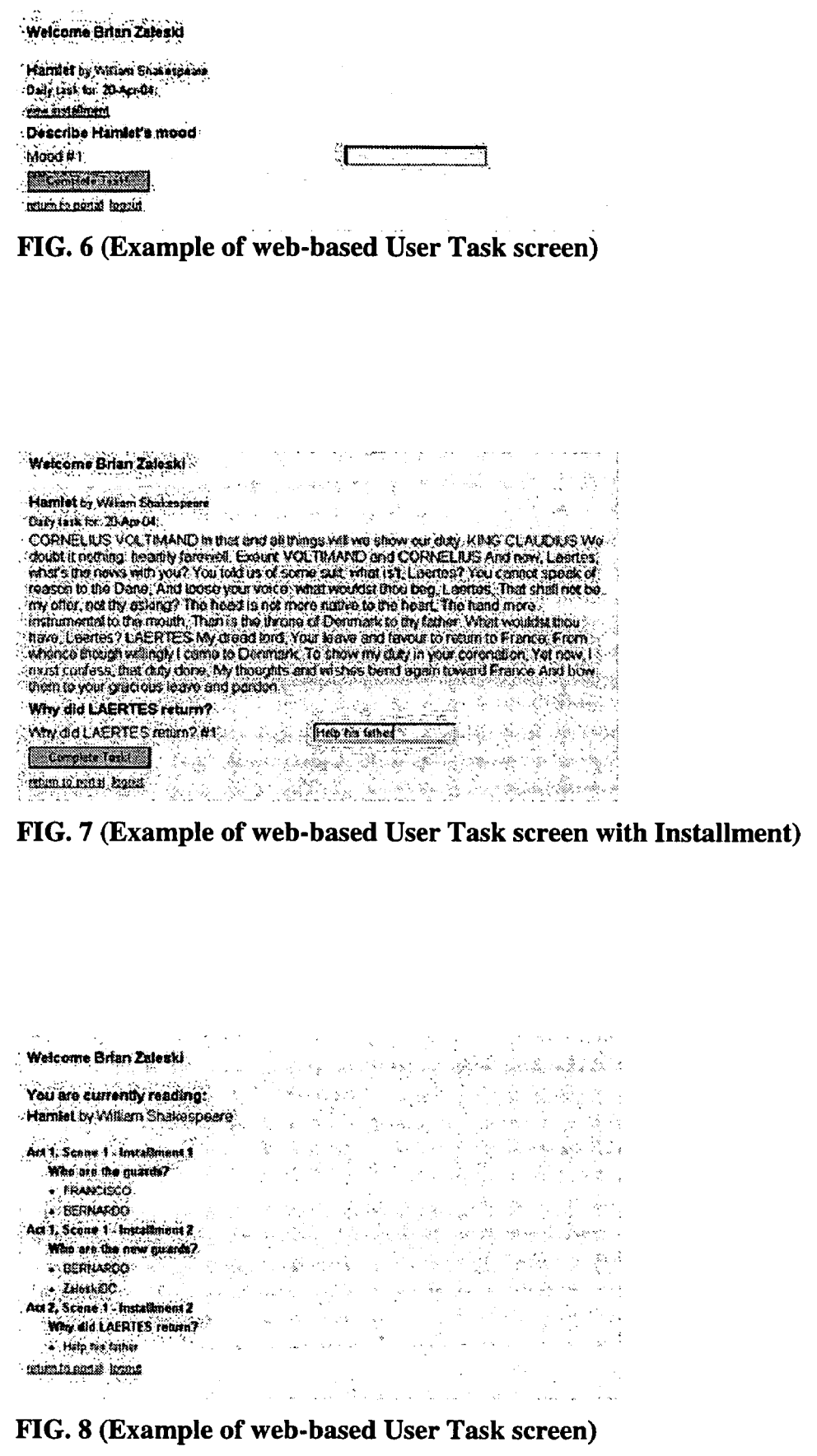

FIG. 6 (Example of web-based User Task screen)

FIG. 7 (Example of web-based User Task screen with Installment)

FIG. 8 (Example of web-based User Task screen)

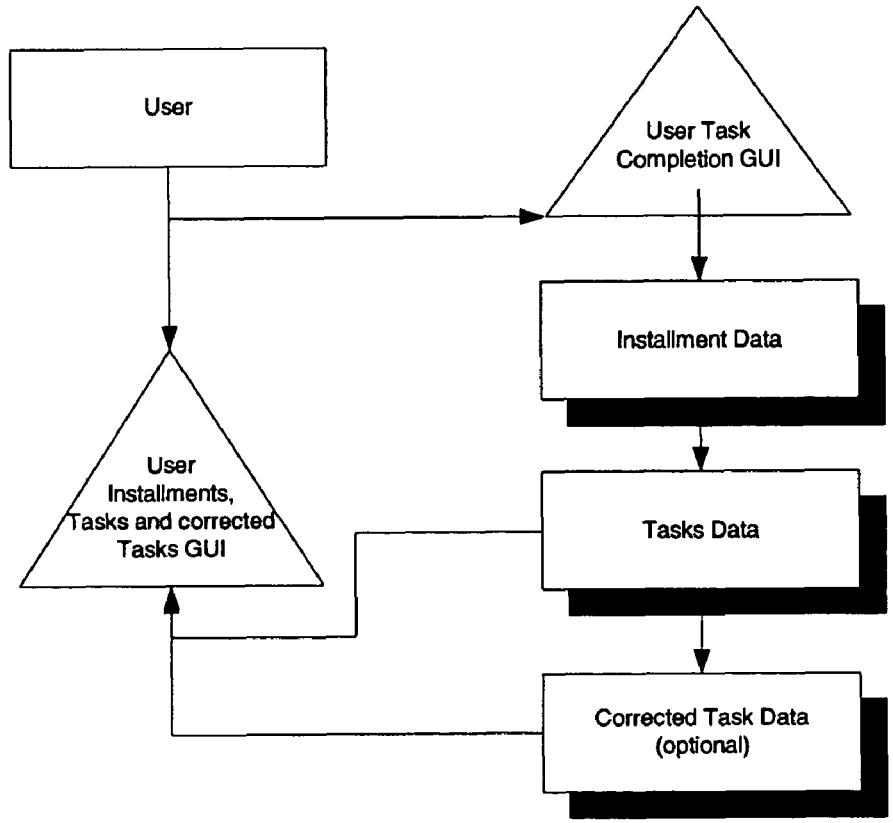
FIG. 9 (Example of web-based User Task screen showing correct answers)
FIG. 10 (User interaction with Task and Installment)

FIG. 11 (Example of web-based Administrator/Manager add Task screen – Part 1)

FIG. 12 (Example of web-based Administrator/Manager add Task screen – Part 2)

FIG. 13 (Example of web-based Administrator/Manager add Task screen – part 3)

Figures 14, 15:
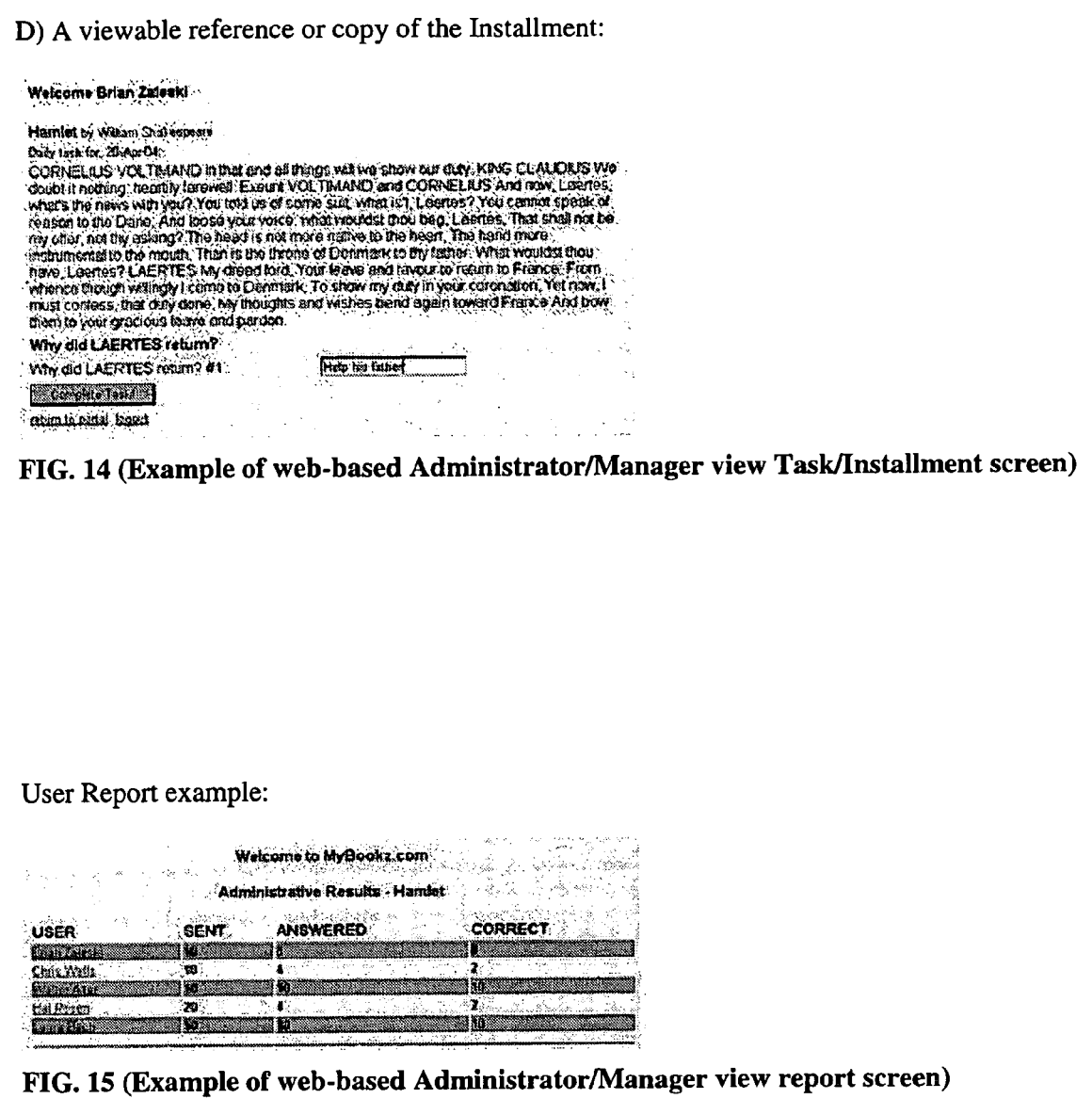

D) A viewable reference or copy of the Installment:

FIG. 14 (Example of web-based Administrator/Manager view Task/Installment screen)

User Report example:

FIG. 15 (Example of web-based Administrator/Manager view report screen)

F) The ability to check the User's input against a database of correct answers (if applicable) and display the results;

Welcome Brian Zaleski

You are currently reading:
Hamlet by William Shakespeare

Act 1, Scene 1 - Installment 1
    Who are the guards?
    • FRANCISCO correct
    • BERNARDO incorrect
Act 1, Scene 1 - Installment 2
    Who are the new guards?
    • BERNARDO correct
    • ZaleskiBC incorrect
Act 2, Scene 1 - Installment 2
    Why did LAERTES return?
    • Help his father correct
return to today's tasks FIG. 16 (Example of web-based Administrator/Manager view report screen)

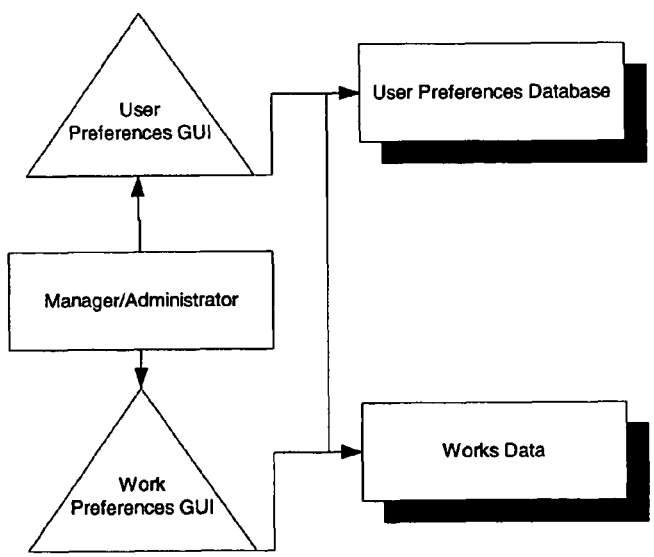

FIG. 17 (Sample Administrator/Manager interaction with User preferences)

FIG. 18 (Example of web-based Manager view publishers screen)

FIG. 19 (Example of web-based Manager add/edit publishers screen)

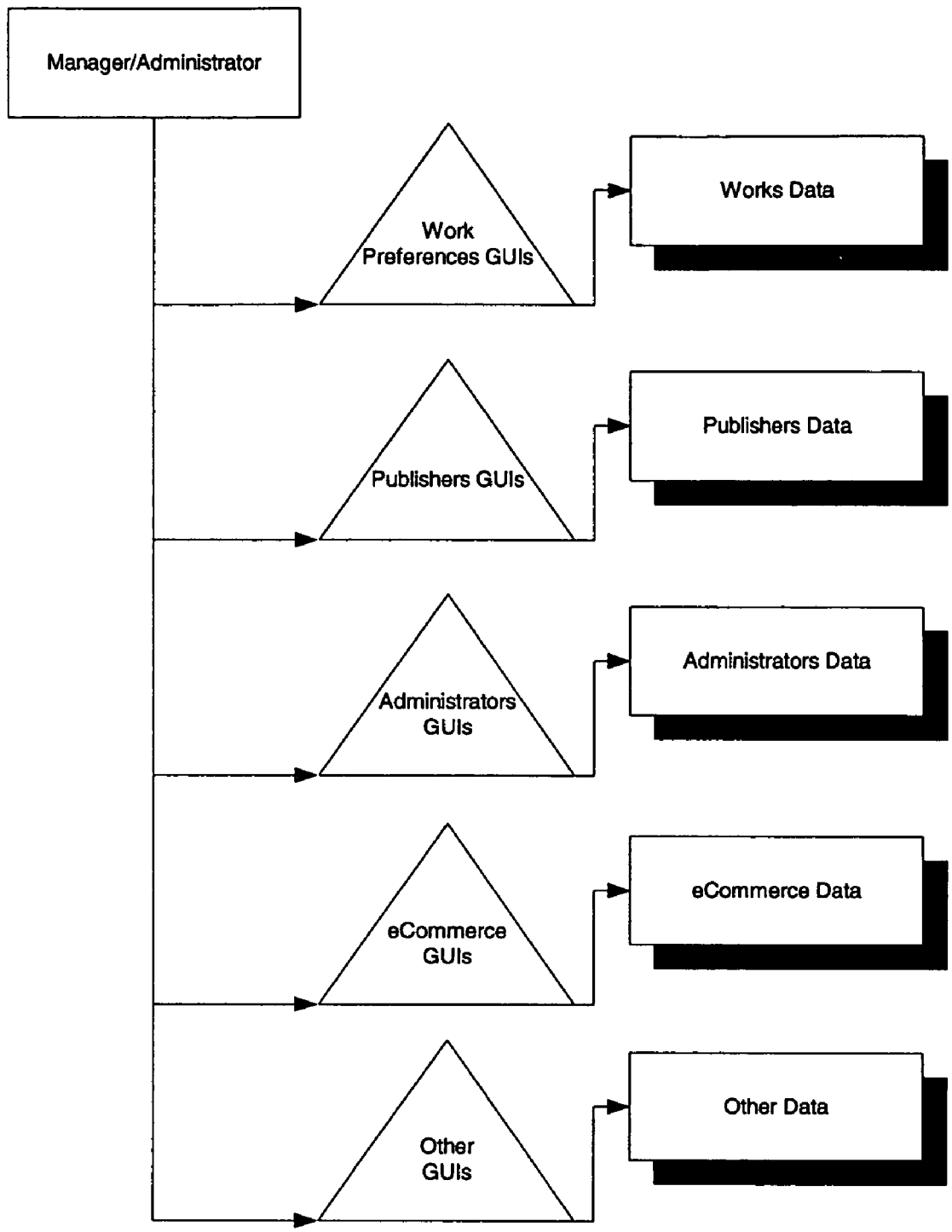
FIG. 20 (Sample Manager administrative tools)

METHODS AND SYSTEMS FOR ELECTRONIC PUBLISHING CONTENT MANAGEMENT

FIELD OF THE INVENTION

The present invention relates generally to the field of publishing. More specifically, the invention relates to electronic publishing content management.

BACKGROUND

Electronic publishing (ePublishing) has been around virtually since the advent of the computer. While ePublishing offers numerous advantages to the author of the work (via lower costs of distribution, lower entry costs into the field, easier portability, etc.) or has added new functionality to the work (via animations, links, assignments, etc.), ePublishing has to this point failed to change the fundamental nature of the work itself. The apparent goal has been to make dissemination of works easier for the publisher. While these advances have provided benefits to the publisher of the work, and may have provided some enhancements to the reader of the work, in fact, many often make it more difficult for the reader to enjoy the work itself.

As an example, Adobe offers what they refer to as an eBook. This is a portable, protected document file format that allows authors to scan or copy their works in a manner that for all intents and purposes resembles the draft copy of the publication they would have previously sent to a printer prior to publication in book form. In essence, the end user is required to act as his or her own printer if they wish to enjoy the work on paper. Alternatively, the user is forced to view the work on a computer screen or other PDF-compatible electronic device.

Published patent application U.S. 2002/01825578 describes the creation of virtual replicas of current works and the ability to add interactive functionality such as animations, links, etc. This approach and others also allow a user to interact with the publication, e.g., by providing a mechanism for the author or reader to ask or answer questions posed in the publication, etc.

In these cases, however, the essential nature of the work itself is unchanged. The user is required to make an active attempt to locate, read and digest the material at the users own pace in an environment that for all intents and purposes still retains the essentially passive qualities of a book or periodical, albeit in a somewhat different format. The link to an eBook on a user's computer desktop no more promotes reading than the paperback lying on the nightstand.

Serialized content has also long been delivered to users via network interfaces. Web sites such as The Daily Inbox (http://dailyinbox.com/) deliver quotes, parts of books or periodicals to users who subscribe to their service via email, PDAs or other interfaces. The publisher in these instances appears to benefit by 1) increasing sales of their print publications through increased awareness or readership of the print publications via their online content distribution, and 2) advertising revenue associated with advertisements delivered with the messages delivered to the end user as a part of the content. Ultimately, the publishers are unconcerned if the end user actually uses, benefits or actually reads the (network or print) publication, the publishers benefit from revenue derived from publication sales and advertising.

BRIEF SUMMARY OF A PREFERRED EMBODIMENT

According to a preferred embodiment of the present invention, distribution of ePublications is fundamentally changed. Rather than focusing upon the needs of the publisher, the focus is on the results that the reader enjoys from the ePublishing experience. The reader's experience is enhanced by incrementally distributing the work and supplementing the work itself by adding an additional interactive component.

When a reader purchases a work, it is fair to presume that they wish to read the work and additionally derive whatever perceived benefits there are from the work. Some works are better delivered to the final user in small increments (installments), and interaction with the work based on the installment enhances the overall user experience. Installments are delivered to the end user on a scheduled basis (and may optionally be delivered upon demand by the user), or as a benefit delivered in exchange for user interaction fulfilling certain criteria. Once the user has received an installment, they are requested or required to perform a task associated with that installment. The user's response (or lack thereof) to these tasks are recorded, and the users are able to later review the results of their responses to the tasks (and the installments). Each task may have correct or incorrect answers, or the task may require an ad hoc response(s). Optionally, an administrator may review the responses of the tasks of various users assigned to a particular administrator.

The end result is that the work is delivered to the reader in a manner that essentially forces the reader to continue to participate in reading and interacting with the work, and provides the user (and optionally an administrator) with a record (and possibly feedback) of the readers results, as well as the content of the work that has previously been delivered to the reader.

The advantages of various embodiments of the invention are numerous. For example, the user continues to perform small, incremental reading while providing responses on a regular basis. Users are no longer overwhelmed by the sheer size, difficulty, or complexity of completing the entire work by themselves without assistance, reassurance or motivation. They continue through the work in a regular fashion with constant reminders of their progress and accomplishments. Studies have shown that there are cognitive reinforcements associated with performing multiple higher brain functions on a single item of interest. For example, research shows that one learns a telephone number more quickly and permanently when one reads, writes and hears that number. Studies also show that people learn better when an item is broken down into smaller incremental pieces. Ultimately, the result is that the user more easily attains his or her goal of completing the work and receiving the benefits thereof.

BRIEF DESCRIPTION OF THE DRAWINGS

FIG. 1 is a diagram illustrating delivery of content to a user;

FIG. 2 is an example of an installment delivered to a user via e-mail;

FIG. 3 is an example of a link and task as part of an installment e-mail;

FIG. 4 is an example of a web-based log-in screen;

FIG. 5 is an example of a web-based user preferences screen;

FIG. 6 is an example of a web-based user task screen;

FIG. 7 is an example of a web-based user task screen with an installment included;

FIG. 8 is another example of a web-based user task screen;

FIG. 9 is an example of a web-based user task screen showing correct answers;

FIG. 10 is a diagram illustrating user interaction with an installment and task;

FIG. 11 is an example of a web-based administrator/manager add task screen (part 1);

FIG. 12 is an example of a web-based administrator/manager add task screen (part 2);

FIG. 13 is an example of a web-based administrator/manager add task screen (part 3);

FIG. 14 is an example of a web-based administrator/manager view task/installment screen;

FIG. 15 is an example of a web-based administrator/manager view report screen;

FIG. 16 is another example of a web-based administrator/manager view report screen;

FIG. 17 is a diagram illustrating administrator/manager interaction with user preferences;

FIG. 18 is an example of a web-based manager view publishers screen;

FIG. 19 is an example of a web-based manager add/edit publishers screen; and

FIG. 20 is a diagram illustrating exemplary manager administrative tools.

DETAILED DESCRIPTION

There are three main users of content management and delivery systems according to exemplary embodiments of the invention:

The end user (AKA user);

An (optional) administrative user who acts as a proxy for various assigned users (AKA administrator); and An administrative user who manages the application itself (AKA manager) and may act in the administrator role. This role also includes the management of an eCommerce site related to various works, users and administrators (with their companies).

Each role has distinct sections of the business processes that they manage. Various business rules that describe these roles are outlined below.

As used herein, a "work" is any related content that can be broken down into discreet parts and disseminated to a user. Examples of works would include: a book (i.e., The Return of the King by J. R. R. Tolkien), a magazine or other periodical, a group of related articles, a training course, the contents of a particular website, etc.

ePublishing content management methods and systems according to exemplary embodiments of the invention comprise:

The User-Related Role:

A discreet set of data that is part of a greater work (AKA an installment), delivered to a user, via a network protocol, on a scheduled or interactive basis.

A work would be divided into small, discreet installments. In general, the idea would be to subdivide each work into a related installment that can easily be read, assimilated and responded to by the end user within a relatively brief period of time. A task would be created for each installment. The task requests or requires that the user provide some feedback regarding the content of the installment.

The operative concept regarding the installment and the task is that the combination of reading, assimilating an answer, and responding to the task should take the average user no more than thirty minutes. FIG. 1 illustrates the flow of installments and tasks to the user. For example, providing the entire text of the Act One of Hamlet (installment) and asking "Provide a brief overview of the Act One of Hamlet" (task) would not be appropriate application of the concept, however, providing the user the following content: The first twenty lines of Act One, Scene One of Hamlet (installment) and "Who are the guards?" with a hyperlink to a site where they may answer a multiple choice question via a form (task) would be appropriate. In an education setting, an appropriate installment and task would be analogous to asking a single quiz question (installment) that requires an answer (task), as opposed to giving the student an essay type test. FIG. 2 illustrates an example of an installment delivered to a user via e-mail.

An Interface to Receive an Installment:

Different network protocols are used to actively deliver installments to the user. Examples of delivery methods include interfaces such as email, Personal Digital Assistant (PDA) and other network delivery protocols.

In currently preferred embodiments, the installment is delivered to the user with no exceptional effort required on the user's part. For example, a user may be required to open up his or her email client and read their email, or synchronize his or her PDA, however they would not be required to open up a web browser and visit a certain site to retrieve the installment. The end-user's activity is essentially passive and delivery of installments occurs naturally within the everyday course of activities. For example, in exemplary embodiments of the invention, the installment is analogous to a package or letter delivered to a user's home versus having to pick a message or installment at up at the post office or a particular location. During the normal course of the day, one would normally check the mailbox or exit their premises (and see a package at the doorstep), whereas one might not routinely go to the post office.

A Task Associated with the Subject Matter of Each Installment that Requests or Requires User Interaction:

The user is requested or required to perform a certain task that is associated with that particular installment. For example, if the text of the installment was: the first twenty lines of Scene One, Act One of Hamlet. A task associated with this installment might be a question like: "Who are the guards?"

In one example, if the installment were sent to the user via email, in order to complete the task, the user would have to: 1) open the email, 2) read the installment, 3) postulate an answer, 4) log into a web site and 5) use a form to fill out the requested information. FIG. 3 depicts an example of a link and task included in an e-mail transmitting an installment.

A Content Management System to Store One or More Structural Elements Associated with Each User and Installment on a User Level:

An example of a content management system might be a web site with a database where users can manage their subscription, change preferences, purchase new works and track their responses to various tasks, etc. Standard database and security protocols are used to ensure data integrity and user privacy. For example, there may be a login screen that allows the user to access protected areas of a web site where their user's information is stored. FIG. 4 depicts an example of such a login screen.

Data regarding the end user is stored in a database. This data might include such items as the users name, address, email address, valid subscriptions, the users preferred method of content delivery, etc. An example might be a real estate brokerage-training course. In the first case, an individual agent purchases the course, and the user may have a great deal of flexibility in the data that they are able to change regarding their own preferences. For example, the user may decide that they wish to have the installments delivered to their email addresses every Monday, Wednesday and Friday at noon. In another case, a real estate office for the benefit of its agents purchases the same course. In this case an administrator controls the users subscription, and ultimately the user may have less flexibility in changing their user preference data. For example, the administrator has determined that the installments will be delivered daily at 1 PM. The user may be allowed to change their mode of delivery (email vs. PDA) or change their email address, however they cannot change the frequency or time of delivery of the installment. FIG. 5 depicts an example of a web-based user preferences screen.

An interface is created where the user can complete the task. In the case of an email installment, this might be a web page that the user can click upon located in a hyperlink embedded in the email itself. Once the user locates the interface, the user is presented with various options to complete the task. Some of these options will involve the nature of the installment or other business rules. Specific examples of the interfaces are further described in the administrative section discussed in the following paragraph. The users' responses (or lack thereof) are stored in a database associated with that work and that installment. FIG. 6 depicts an interface where the user can complete the task.

The user has the ability to view copies of installments that they have received or completed. Business rules and user preferences may dictate which installments the user is able to view. An example might be a real estate brokerage-training course. In the first case, an individual agent purchases the course, and the user may decide that they wish to view all of their installments at one time, completed or not. In another case a real estate office for the benefit its agents purchases the same course. In this case an administrator controls the users subscription, only allowing users to view those installments that they have successfully completed. Alternatively, the user or administrator may decide to view only installments associated with correctly (or incorrectly) answering the associated task. Other examples might be the ability to only view installments received within the past month, etc. FIG. 7 depicts a viewable reference or copy of the installment.

The user has the ability to view the results of tasks that they have received or completed. Business rules and user preferences may dictate which tasks the user is ultimately able to view. An example might be a real estate brokerage-training course. In the first case an individual agent purchases the course, and the user may decide that they wish to view all of their tasks at one time, completed or not. In another case a real estate office for the benefit of all of their agents purchases the same course. In this case an administrator controls the users subscription, only allowing users to view those tasks that they have successfully completed. Alternatively the user or administrator may decide to show only tasks associated with correct (or incorrect) answers. Other examples might be the ability to only view tasks received within the past month, etc. FIG. 8 depicts the results of the users action or lack thereof.

In some embodiments, it may be appropriate for the user to receive feedback regarding the "correctness" of a particular answer to a particular task. Business rules and/or the appropriateness of an answer would be key in this instance. The business rules and results are similar to those described in the preceding paragraph. FIG. 9 depicts a screen showing correct and incorrect answers.

An Optional Electronic Commerce Component:

Standard eCommerce protocols and methodologies are used to (optionally) allow a user to purchase works directly.

The Administrator and/or Manager-Related Role:

A content management system to store one or more structural elements associated with each user and installment on an administrative level:

Add or Edit Installment:

Each installment (and associated data) is entered into a database. The installment is a part of the larger work. Specific information and rules may be associated with an individual installment or work. For example, business rules may dictate that an installment can be no longer than three paragraphs or 1500 characters in work A, while they are limited to two paragraphs or 1000 characters in work B. Installments may be entered into the database using various methodologies including the importation of electronic documents, manual data entry, etc.

A task is also associated with each installment. The nature of the task and how it is displayed to the user may vary depending upon the methods used in the content management system and the work itself. For example, if a web based content management system is being used, business rules may dictate that the length of the body of the task can be no more than 200 characters and that the answers to the tasks are in a format that requires a single answer (as in a radio button) for work A, while work B allows that the length of the body of the task can be no more than 500 characters and that the users responses may be ad hoc, multiple choice or single answer.

Some tasks may have a correct answer. For example, if the text of the installment was: "The first twenty lines of Act One, Scene One of Hamlet," a task associated with this installment might be a question like: "Who are the guards?" In this example, the correct answer would be "Bernardo and Francisco".

Business rules may dictate if and when the user has the ability to view the correct answers. An example might be a real estate brokerage-training course. In one embodiment, an individual agent purchases the course and decides that they wish to have immediate feedback regarding the correctness of their answers. In another embodiment, a real estate office purchases the same course for the benefit of its agents. In such an embodiment, an administrator decides that the users may only view the correct answers at the end of each completed chapter. FIG. 11 depicts a screen where an administrator/manager can add or edit installments and tasks. FIG. 12 depicts another screen where an administrator/manager can set preferences for installments and tasks. FIG. 13 depicts another screen where an administrator/manager can set preferences for installments and tasks. FIG. 14 depicts a screen where an administrator/manager can view installments and tasks.

Reporting and Administrative Tools Associated with the Administrator/Manager Role:

Administrative tools and reports associated with managing the administrative level of the content management database may include one or more of the following:

Tools/Reports

Report on the status of users and results of their tasks

Report on the various works administered by the administrator

Various publishers administered by the administrator

Etc.

FIG. 15 depicts an example of an administrator/manager report screen showing results of tasks completed by various users.

FIG. 16 depicts an example of an administrator/manager report screen comparing a user's input with a database of correct answers (if applicable) and display the results.

Manager-Related Role:

Administrative tools and reports associated with managing the manager role of the content management database may include one or more of the following:

Tools/Reports

Report on the status of users and results of their tasks

Report on the status of administrators

Report on the various works administered by the manager

Report on the various works administered by administrators

Add/edit publishers

Add/edit works

Add/edit administrators (and their companies)

Etc.

FIG. 18 depicts an example of a manager screen for viewing publishers. FIG. 19 depicts an example of a manager screen for adding and editing publishers.

Send Installments:

The text of the installment and associated task is delivered to the user on a scheduled basis using the appropriate network protocol. For example, if the method used is email, a job would run that would query the database on a regular basis, check for all of the pending scheduled installments for legitimate users, and deliver this information to an SMTP server that would in turn send the installment out to the users. Another query would then update the users account with the date and time that the installment was sent to the user.

Administrative tools and reports associated with managing the manager role of the (optional) electronic commerce database may include one or more of the following:

Tools/Reports

Report on the status of works

Sales reports

Add/edit publishers

Add/edit works

Add/edit users

Etc.

The electronic commerce database may be connected in some manner to the content management database. Examples might include such common tables such as: works data, user data, and company data, etc. FIG. 20 is a diagram illustrating exemplary manager administrative tools.

It is to be understood that the above-described embodiments are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications may be made without departing from the principles and concepts set forth herein.

I claim:

1. A method for enhancing a reader's experience with an electronically published work, comprising:

partitioning the electronically published work into multiple installments wherein each of the multiple installments can be read and assimilated by the reader in thirty minutes or less;

distributing a first installment of the electronically published work to the reader; and distributing a subsequent installment of the electronically published work as a result of the occurrence of a specified event, wherein the occurrence of a specified event comprises offering an interactive component regarding the content of the first installment and wherein offering an interactive component regarding the content of the first installment comprises:

directing the reader to a network location;

authenticating the user before providing a query interface;

providing the query interface at the network location to receive submission of a response;

requiring the reader to submit the response to a first installment content query via the network to a content management server and storing the response at the content management server; and enabling the reader to review the response after submission of the response to the content management server.

2. The method according to claim 1, further comprising enabling the reader to review a previously delivered installment of the electronically published work.

3. The method according to claim 1, wherein distributing the first installment and distributing the subsequent installment comprise delivering via a network.

4. The method according to claim 1, wherein distributing the first installment and distributing the subsequent installment comprise delivering via e-mail.

5. The method according to claim 1, wherein distributing the first installment and distributing the subsequent installment comprise delivering via a network to a PDA device.

6. The method according to claim 1, wherein requiring the reader to submit a response to a first installment content query before advancing to a subsequent installment of the work comprises requiring the reader to submit a correct response to a first installment content query before advancing to a subsequent installment of the work.

7. The method according to claim 1, further comprising providing feedback to the reader regarding the response to the first installment content query.

8. The method according to claim 1, further comprising providing the reader with a model response to the first installment content query after submission of the reader's response.

9. The method according to claim 1, wherein distributing the first installment comprises delivering the first installment at a predetermined time.

10. The method according to claim 1, wherein distributing the first installment comprises delivering the first installment responsive to a request by the reader.

11. The method according to claim 1, wherein offering an interactive component regarding the content of the first installment comprises:

requesting the reader to submit a response to a first installment content query;

directing the reader to a network location; and providing a query interface at the network location to receive submission of the response.

12. The method according to claim 11, further comprising authenticating the user before providing the query interface.

13. The method according to claim 11, wherein requesting the reader to submit a response comprises requesting the reader to submit a response via a network to a content management server.

14. The method according to claim 13, further comprising storing the response at the content management server.

15. The method according to claim 14, further comprising enabling the reader to review the response after submission of the response to the content management server.

16. The method according to claim 11, further comprising enabling the reader to review a previously delivered installment of the electronically published work.

17. The method according to claim 11, wherein delivering the first installment and delivering the subsequent installment comprise delivering via a network.

18. The method according to claim 11, wherein delivering the first installment and delivering the subsequent installment comprise delivering via e-mail.

19. The method according to claim 11, wherein delivering the first installment and delivering the subsequent installment comprise delivering via a network to a PDA device.

20. The method according to claim 11, further comprising providing feedback to the reader regarding the response to the first installment content query.

21. The method according to claim 11, further comprising providing the reader with a model response to the first installment content query after submission of the reader's response.

22. The method according to claim 11, wherein delivering the first installment comprises delivering the first installment at a predetermined time.

23. The method according to claim 11, wherein delivering the first installment comprises delivering the first installment responsive to a request by the reader.

24. The method according to claim 11, wherein delivering the first installment comprises delivering the first installment substantially without reader action.

25. The method according to claim 11, wherein delivering the first installment comprises delivering the first installment upon satisfaction of a predetermined criterion by the reader.

26. The method according to claim 1, wherein the occurrence of a specific event comprises the reader requesting the subsequent installment.

27. The method according to claim 1, wherein the occurrence of a specific event comprises passage of a specified period of time.

28. The method according to claim 1, wherein the occurrence of a specific event comprises a predetermined schedule.

29. A method for enhancing a reader's experience with an electronically published work, comprising:

means for partitioning the electronically published work into multiple installments wherein each of the multiple installment can be read and assimilated by the reader in thirty minutes or less;

means for distributing a first installment of the electronically published work to the reader means for distributing a subsequent installment of the electronically published work as a result of the occurrence of a specified event wherein the occurrence of a specified event comprises offering an interactive component regarding the content of the first installment and wherein offering an interactive component regarding the content of the first installment comprises:

directing the reader to a network location;

authenticating the user before providing a query interface;

providing the query interface at the network location to receive submission of a response;

requiring the reader to submit the response to a first installment content query via the network to a content management server and storing the response at the content management server; and enabling the reader to review the response after submission of the response to the content management server.

* * * * *